Jan. 31, 1956  J. E. MURPHY  2,732,783
ROTARY CULTIVATOR
Filed April 13, 1951  2 Sheets-Sheet 1
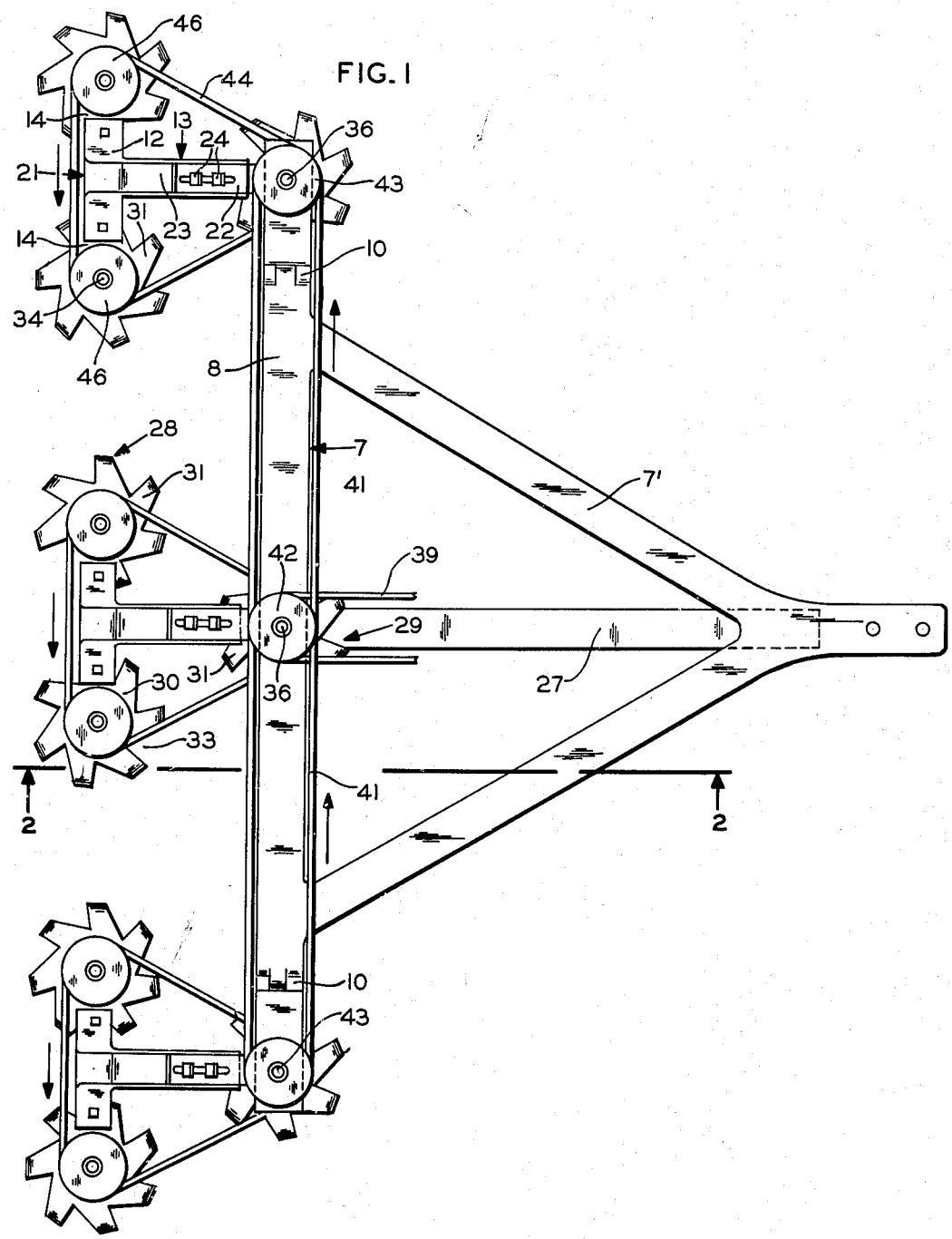
FIG. I
INVENTOR.
JOSEPH E. MURPHY
BY *Harry D. Kilgore*
ATTORNEY Jan. 31, 1956  J. E. MURPHY  2,732,783
ROTARY CULTIVATOR
Filed April 13, 1951  2 Sheets-Sheet 2
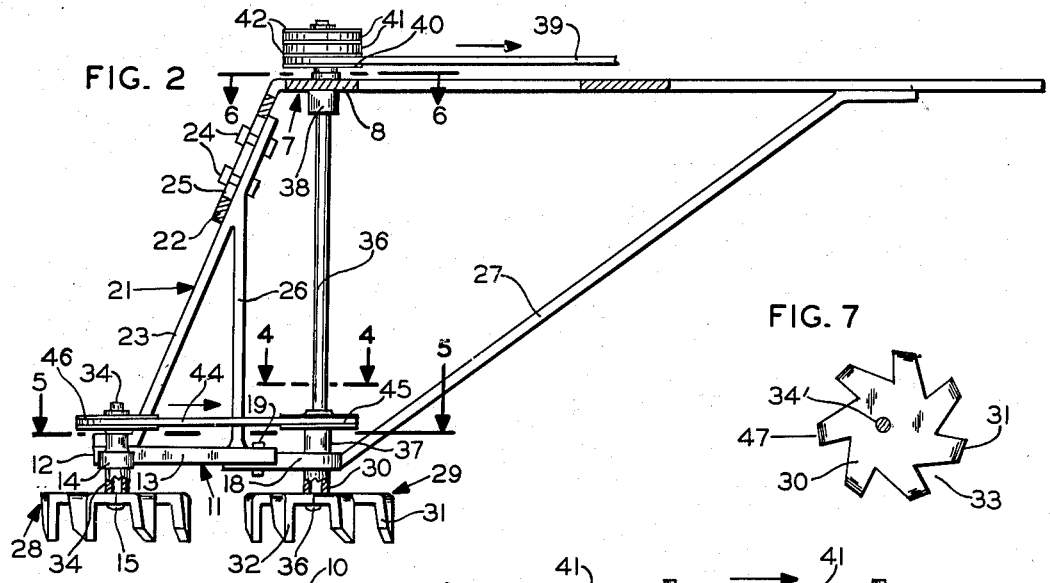
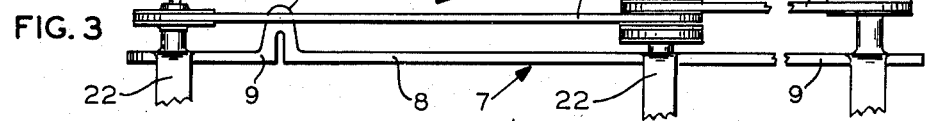
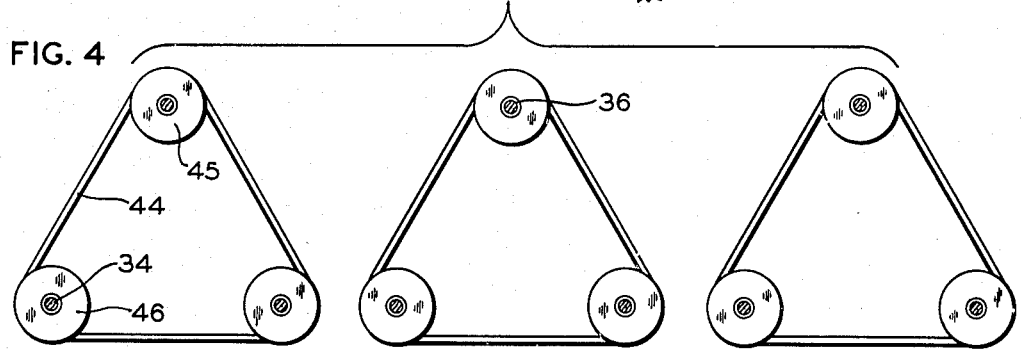
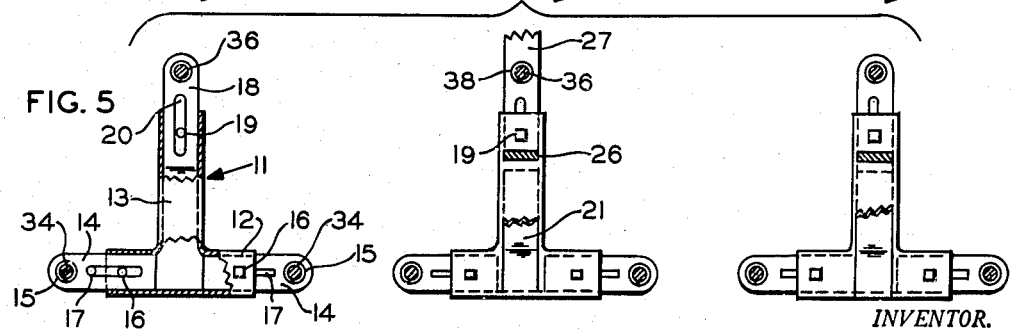
INVENTOR.
JOSEPH E. MURPHY
BY
Harry D. Kilgore
ATTORNEY ial # United States Patent Office 2,732,783
Patented Jan. 31, 1956

2,732,783
ROTARY CULTIVATOR
Joseph E. Murphy, Minneapolis, Minn.

Application April 13, 1951, Serial No. 220,827

2 Claims. (Cl. 97—43)

My present invention relates to improvements in cultivators and, more particularly, to a pulverizing cultivator.

The primary object of this invention is to provide revolutionary means, for pulverizing and leveling the soil in the preparation of seed beds, in the form of a driven member mounted to turn about a vertical axis and having circumferentially spaced depending pulverizing members.

It may be here stated that the improved pulverizer is capable of use as a single unit but preferably in multiple units and arranged either in a single transverse row or staggered. The pulverizing cultivator may be directly drawn by a tractor or attached to follow a farm implement such as a disk plow.

To the above end, the invention consists of the novel devices and combination of devices hereinafter described and defined in the claims.

In the accompanying drawings, which illustrate one embodiment of the invention, like characters indicate like parts throughout the several views.

Referring to the drawings:

Fig. 1 is a plan view of the improved pulverizing cultivator;

Fig. 2 is a view principally in side elevation with some parts sectioned on the line 2—2 of Fig. 1 and with some parts broken away and sectioned;

Fig. 3 is a rear view of the upper frame, some parts being broken away and also showing the pulley and belts mounted thereon;

Fig. 4 is a plan view of the driven pulleys and belts for the pulverizing devices with the shafts sectioned on the line 4—4 of Fig. 2;

Fig. 5 is a plan view of the several sub-frames, some parts being broken away and sectioned and also showing some parts sectioned on the line 5—5 of Fig. 2;

Fig. 6 is a fragmentary plan view of the upper frame and also showing the shafts sectioned on the line 6—6 of Fig. 2; and Fig. 7 is a plan view of a pulverizer having a shaft that is eccentric to the axis of said pulverizer.

The numeral 7 indicates an upper frame in the form of a long, flat horizontal bar that extends transversely of the pulverizing cultivator. This upper frame 7 includes a long intermediate section 8 and short end sections 9. The end sections 9 are attached to the intermediate section 8 by upwardly offset hinges 10 for vertical swinging movements. When the sections 8 and 9 are aligned, the adjacent ends thereof are spaced apart and act as stops to limit the down-swinging movements of the end sections 9 relative to the intermediate section 8. Integral with the front longitudinal edge of the intermediate section 8 is a Y drawbar 7'.

Rearward of the upper frame 7 are, as shown, three sub-frames 11, each formed of inverted channel bars in the form of the letter T. The head section 12 of each sub-frame 11 is parallel to the upper frame 7 and the body section 13 thereof extends toward said upper frame. Slidably mounted in each end portion of each head section 12 is a rectangular bar 14 having on its outer end portion a sleeve bearing 15 that extends both above and below said bar. Each bar 14 is adjustably secured to the head section 12 by a nut-equipped bolt 16 that extends through a hole in the web of the head section 12 and an elongated slot 17 in said bar. A rectangular bar 18 is slidably mounted in the outer end portion of each body section 13 and adjustably secured thereto by a nut-equipped bolt 19 that extends through a hole in the web of the body section and an elongated slot 20 in said body section.

Tension bars 21 comprising an upper section 22 and a lower section 23 connect the intermediate sub-frame 11 to the intermediate section 8 of the upper frame 7 and the end sub-frame 11 to the end sections 9 of said upper frame. The upper sections 22 of the tension bar 21, at their outer ends, are integral with the rear longitudinal edge of the upper frame sections 8 and 9. The lower sections 23 of the tension bars 21, at their outer end portions, are rigidly secured to the head sections 12 of the sub-frames 11 at their longitudinal centers. The inner end portions of the sections 22 and 23 are overlapped and adjustably connected by a pair of nut-equipped bolts 24 that extend through holes in the lower section 23 and elongated slots 25 in the upper sections 22. The lower sections 23 of the tension bars 21 at their upper end portions are supported on braces 26 secured to the body sections 13 of the sub-frames 11 at their outer end portions. An inclined tension bar 27 connects the bar 18 of the central sub-frame 11 to the drawbar 7' at its outer end portion.

Each sub-frame 11 is provided with a pair of rear pulverizers 28 and a front pulverizer 29. Each pulverizer 28—29 includes a head 30 in the form of a horizontal disk. Integral with the perimeter of each head 30 is a plurality of long, wide circumferentially spaced teeth 31. The front longitudinal edges of the teeth 31 are primarily on radial lines extending from the axis of the heads 30. The rear longitudinal edges of the teeth 31 are inclined and the outer end portions of said teeth are edgewise beveled to sharp points 32. The teeth 31, near their inner ends, are bent downwardly perpendicular to the heads 30, thus leaving passageways 33 between the upper or horizontal portions of said teeth.

Each pulverizer 28 is provided with a short upstanding shaft 34 fixed at its lower end to the head 30 of said pulverizer at the axis thereof. The shafts 34 are journaled in the sleeve bearings 15. Each front pulverizer 29 is provided with a long upright shaft 36 fixed at its lower end to the head 30 of said pulverizer at the axis thereof. The shafts 36 are journaled in sleeve bearings 37 similar to the sleeve bearings 15, on the outer end portions of the bars 18 and bearings 38 on the upper frame sections 8—9.

It may be here stated that the drawbar 7' may be attached directly to a tractor or a propelled farm implement, for instance, a disk plow.

The central shaft 36 is rotated by a belt 39 that runs over a driven pulley, not shown, on a tractor or other source of power, and a pulley 40 on said shaft above the upper frame 7. In place of the belt 39 and pulley 40, the central shaft 36 may be driven by a jack shaft and gears from a driven take-off. The long end shafts 36 are driven by belts 41 that run over a pair of puleys 42 on the central shaft 36 above the pulley 40 and a pulley 43 on each of the end shafts 36.

Obviously, the front pulverizers 29 are rotated by the driven shafts 36, and the rear pulverizers 28 are driven by belts 44 that run over pulleys 45 on the long shaft 36 and pulleys 46 on the short shafts 34 above the sub-frames 11.

The hinged sections 8 and 9 of the upper frame 7 permit the pulverizers 28—29 to adjust themselves to the contour of the soil. During rotation of the pulverizers 28 and 29 in pulverizing the soil, the soil is free to move through the passageways 33 outwardly of the heads 30 without clogging. Rotation of the pulverizers 28—29 not only pulverizes the soil to a fine consistency, which is essential for a seed bed, but levels the soil so that the seeds are all planted to the same depth. The finely pulverized soil produced by the pulverizers 28—29 acts as a mulch to conserve moisture, which is essential for the germination and growth of the seed.

The sub-frames 11 are laterally spaced apart to leave plant passageway between the pulverizers of adjacent sub-frames and under the upper frame 7.

While the drawings show one embodiment of the invention, it will, of course, be understood that it is capable of a large number of modifications thereof as to mounting, arrangement and operation of the pulverizers.

Obviously, by adjusting the sub-frames 11 relative to the bars 18, the tension of belts 41 may be varied. By adjusting the bars 14 relative to the head sections 12, the pulverizing devices 28 of each sub-frame may be set different distances apart, thus varying the width of the plant passageways between the sub-frames 11.

The pulverizer 47 shown in Fig. 7 is identical with the pulverizers 28—29, except its shaft 48 is eccentric to its axis. The parts of the pulverizer 47 that corresponds to like parts of the pulverizers 28—29 are given the same reference numerals followed by a prime.

The action of the pulverizer 47 is the same as the pulverizers 28—29 except it covers a wider area in pulverizing and leveling.

What I claim is:

1. In an implement of the class described, an upper frame comprising intermediate and end sections hingedly connected for movements in a vertical plane, the intermediate section of the upper frame having means for attaching the device to tractive power, a sub-frame rearwardly of each section of the upper frame and attached thereto, each sub-frame having a front rotatable soil pulverizing device provided with a long vertical shaft journaled on said sub-frame and one of the sections of the upper frame, power means for turning the long vertical shaft, each sub-frame also having a pair of rear pulverizing devices having short vertical shafts journaled on the sub-frame, and means for turning each pair of rear pulverizing devices from the respective long vertical shaft.

2. In an implement of the class described, a horizontally disposed frame in the form of a T including a body section and a head section extending transversely of the implement, with the body section extending forwardly, said body section having an endwise adjustable extension, each end portion of the head section having an endwise adjustable extension, three rotatable soil pulverizing devices each having at its axis an upright shaft, one of the shafts being journalled in the body section extension, the other shafts being journalled, one in each of the head section extensions, a pulley fixed to each shaft, a belt arranged to run over the pulleys, means for driving said one shaft, and a drawbar fixed relative to the frame.

References Cited in the file of this patent

UNITED STATES PATENTS

| | | |
|---|---|---|
| 594,837 | Fleming | Nov. 30, 1897 |
| 823,933 | Davis | June 19, 1906 |
| 1,145,240 | Gouldh | July 6, 1915 |
| 2,205,188 | Cuddigan et al. | June 18, 1940 |
| 2,539,934 | Smith et al. | Jan. 30, 1951 |
| 2,545,173 | Shaw | Mar. 13, 1951 |